(12) United States Patent
Husain

(10) Patent No.: US 8,449,651 B2
(45) Date of Patent: May 28, 2013

(54) METHODS OF PREPARING A CROSSLINKED FIBER MEMBRANE

(75) Inventor: Shabbir Husain, Emeryville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 158 days.

(21) Appl. No.: 12/868,661

(22) Filed: Aug. 25, 2010

(65) Prior Publication Data

US 2012/0048107 A1    Mar. 1, 2012

(51) Int. Cl.
| | |
|---|---|
| B01D 53/22 | (2006.01) |
| B01D 71/40 | (2006.01) |
| B01D 71/64 | (2006.01) |
| C08J 5/22 | (2006.01) |
| D01D 5/24 | (2006.01) |

(52) U.S. Cl.
USPC ............. 95/45; 95/47; 95/50; 95/51; 95/54; 96/4; 96/8; 96/10; 96/11; 96/13; 96/14; 264/203; 264/210.1; 521/27

(58) Field of Classification Search
USPC ............. 95/45, 51, 47, 50, 54; 96/4, 11, 12, 96/13, 8, 10, 14; 264/178 R, 203, 209.6; 521/27
See application file for complete search history.

(56) References Cited

U.S. PATENT DOCUMENTS

| | | | |
|---|---|---|---|
| 4,728,345 | A | 3/1988 | Murphy |
| 5,085,676 | A | 2/1992 | Ekiner et al. |
| 5,104,532 | A | 4/1992 | Thompson et al. |
| 5,288,304 | A | 2/1994 | Koros et al. |
| 6,755,900 | B2 | 6/2004 | Koros et al. |
| 6,932,859 | B2 | 8/2005 | Koros et al. |
| 7,247,191 | B2 | 7/2007 | Koros et al. |
| 8,066,799 | B2 * | 11/2011 | Miller et al. ............ 95/45 |
| 2005/0268783 | A1 | 12/2005 | Koros et al. |
| 2009/0165645 | A1 | 7/2009 | Wind et al. |
| 2009/0178561 | A1 * | 7/2009 | Miller et al. ............ 95/273 |

OTHER PUBLICATIONS

Ekiner et al., "Polyaramide Hollow Fibers for Hydrogen/Methane Separation—Spinning and Properties," *Journal of Membrane Science*, 1990, vol. 53, pp. 259-273.

Koros et al., "Membrane-based gas separation," *Journal of Membrane Science*, 1993, vol. 83, pp. 1-80.

* cited by examiner

*Primary Examiner* — Jason M Greene

(74) *Attorney, Agent, or Firm* — Richard J. Schulte

(57) ABSTRACT

Disclosed herein is a method for preparing a crosslinked hollow fiber membrane. The method involves spinning a one phase solution comprising a monoesterified polyimide polymer, acetone as a volatile solvent, a spinning solvent, a spinning non-solvent, and optionally an organic and/or inorganic additive, wherein the volatile solvent is present in an amount of greater than 25 wt. % to about 50 wt. %, based on the total weight of the solution.

19 Claims, 3 Drawing Sheets

(1) Monoesterification (2) Transesterification

METHODS OF PREPARING A CROSSLINKED FIBER MEMBRANE

BACKGROUND

1. Technical Field

The present invention generally relates to methods for preparing crosslinked fiber membranes and their use in separating components of a gaseous mixture.

2. Description of the Related Art

Polymeric membranes for separating mixtures of gases, such as methane and carbon dioxide are known. For example, U.S. Pat. Nos. 7,247,191; 6,932,859; and 6,755,900, disclose crosslinkable polymers and crosslinked hollow fiber membranes made from such crosslinkable polymers. These patents further disclose a crosslinkable polyimide polymer. The crosslinkable polyimide polymer can be made by monoesterifying a polyimide polymer with a crosslinking agent.

A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions in order to create covalent ester crosslinks within the fibers. Such fibers can be hollow fibers or other types of fibers. Crosslinked hollow fiber membranes can be incorporated into a separation module. Other types of membranes for separation include flat sheet separation membranes or flat stack permeators.

Integrally skinned hollow fiber membranes can be formed by contacting the polymer solution with a non-solvent and forming the membrane in a one step process. On contact with the non-solvent, mass transfer takes place between the non-solvent from the coagulation bath and the solvent in the nascent membrane resulting in micro-phase separation within the membrane. Depending on the pathway of phase separation, a dense layer, also called the skin layer, is believed to form on the surface of the membrane. The skin formation is hypothesized to occur when solvent outflow from the membrane exceeds the non-solvent inflow resulting in delayed demixing. This process increases the concentration of the polymer at the membrane-coagulant interface and forms the skin. An evaporative step in the air gap can be included prior to the phase separation step to enhance skin formation by the evaporation of the volatile solvent from the nascent membrane followed by a rapid phase separation of the underlying region to form a highly porous support.

Polymer solutions used in hollow fiber membrane spinning consist of polymer, solvents, non-solvent and additives. When the number of components exceeds three, a pseudo-ternary phase diagram of more than three components can be devised by dividing the components into categories of polymer, solvent and non-solvent. Within each category, the components can be fixed in ratio to each other to restrict solvency and/or non-solvency power. This approach based on fixed ratios enables holding solvency parameters constant for the solvents and nonsolvents that can be explored in the system and a binodal (set of concentrations separating the single phase and two phase regions) obtained.

While not wishing to be bound by any particular theory, ternary phase diagrams can be developed (1) by the titration of the polymer solution with non-solvent, (2) through the use of the three-phase Flory-Huggins theory for polymer solutions, and (3) by inspection of polymer solutions of various compositions of polymer/solvent/nonsolvent. Depending on the polymer viscosity in solution, the dope compositions are made to cover the region of interest for fiber spinning (usually 20 to 40 wt. % polymer). The binodal curve can be generated by making small samples (10 to 15 gram) of various compositions and visually inspecting them for phase separation.

Once the binodal has been identified, three factors taken into consideration when determining the dope formulation are: (1) proximity of the dope composition to the binodal, (2) osmotic pressure of the solution, and (3) polymer solution viscosity.

The proximity of the polymer solution composition to the binodal and osmotic pressure of the solution determine the kinetics of membrane formation and membrane morphology. Osmotic pressure has earlier been suggested as the cause for the large finger/tear shaped voids (macrovoids) found in certain membranes. To describe the phase separation of the polymer solution (in forming the membrane), a ternary diagram can be formed which groups all the solvents, nonsolvents and additives into the solvent category, and depicts the coagulant (typically water) in the nonsolvent category. Based on the proximity of the polymer solution to the binodal, the quantity of coagulant required to phase separate the polymer solution can be determined. Since the penetration of the coagulant into the polymer solution is limited by the rate of diffusion, the distance of the polymer solution from the binodal and the osmotic pressure driving force determines the rate and type of phase separation. Compositional change on the ternary phase diagram (FIG. 1) from point 1 (original polymer solution) to point 2 is hypothesized for the skin and from point 1 to an arbitrary position 3 (in the spinodal region) for the support layer of the membrane. The objective is to drive phase separation of the support layer through spinodal decomposition mechanism to form a highly porous support with little or no resistance to gas flow.

The minimum polymer solution viscosity depends on the strength of the polymer solution strand which undergoes elongation (under gravity) that takes place after the fiber exits the spinneret. Based on the air gap and draw ratio, this minimum viscosity must be defined for each polymer/solvent/nonsolvent system. A higher viscosity can be achieved by increasing the polymer concentration in the polymer solution or by adding viscosity enhancers, like lithium nitrate ($LiNO_3$) and carboxylic acids which complex with the common spinning solvents (i.e. N-methyl-2-pyrrolidone). Although a high polymer concentration is generally required to promote skin growth and increase viscosity for spinning, it is believed that too high of a polymer concentration would reduce porosity in the support layer and form a support layer with substantial resistance to gas flow which is undesirable.

Solvents and non-solvents are selected, in part, for their miscibility with the aqueous coagulant. Another factor for consideration in the selection of the polymer solution solvent is the generation of osmotic pressure during phase separation. The osmotic pressure is a function of the thermodynamic activities of the solvent and coagulant non-solvent, and is believed to be a factor in the formation of macrovoids.

The crosslinked hollow fiber membranes have good permeability and selectivity. The crosslinked hollow fiber membranes also have good resistance to plasticization. Plasticization occurs when one or more components of a fluid mixture causes the polymer to swell thereby altering the properties of the membrane. For example, polyimides are particularly susceptible to plasticization by carbon dioxide. Subjecting the fibers to transesterification conditions to crosslink the crosslinkable polyimide polymer within the fibers increases both resistance to plasticization and selectivity.

The above referenced patents disclose the use of sufficiently high molecular weight polyimide polymers to accommodate for molecular weight loss during the monoesterification process. However, it is difficult to produce crosslinkable polyimide polymers having such a high molecular weight. Therefore, there is a need for a method of making a crosslinkable (i.e., monoesterified) polyimide polymer that reduces or eliminates the loss of molecular weight during the monoesterification process, i.e., a high molecular weight, monoesterified polyimide polymer, while having improved strength, flexibility, and/or spinnability.

SUMMARY

In accordance with one embodiment, there is provided a method for preparing a crosslinked hollow fiber membrane, which comprises spinning a one phase solution comprising a monoesterified polyimide polymer, acetone as a volatile solvent, a spinning solvent, and a spinning non-solvent, wherein the volatile solvent is present in an amount of greater than 25 wt. % to about 50 wt. %, based on the total weight of the solution.

In accordance with a second embodiment, there is provided a method for preparing a crosslinked hollow fiber membrane, which comprises spinning a one phase solution comprising a monoesterified polyimide polymer, acetone as a volatile solvent, a spinning solvent, and a spinning non-solvent, wherein the volatile solvent is present in an amount of greater than 25 wt. % to about 50 wt. %, based on the total weight of the solution, and subjecting the monoesterified polyimide polymer fiber to transesterification conditions to form a crosslinked polyimide hollow fiber membrane.

In accordance with a third embodiment, there is provided a method for preparing a crosslinked hollow fiber membrane, which comprises spinning a one phase solution comprising a monoesterified polyimide polymer, a volatile solvent having a threshold limit value time-weighted average (TLV-TWA) toxicity of greater than 200 parts per million (ppm) exposure limit, a spinning solvent, and a spinning non-solvent, wherein the volatile solvent is present in an amount of greater than 25 wt. % to about 50 wt. %, based on the total weight of the solution.

The use of a relatively high concentration of acetone in the polymer solution in place of tetrahydrofuran (THF) advantageously obtains a sufficient quantity of evaporative solvent (e.g., acetone) while also maintaining a single phase polymer solution. Acetone has less stringent storage requirements compared to THF, which can form explosive peroxides. In addition, while not wishing to be bound by theory, it is believed that the use of a relatively high concentration of acetone in the polymer solution aids in the skin formation of the membrane in the air gap resulting in less skin defects. It is further believed that the use of a relatively high concentration of acetone in the polymer solution aids in limiting the skin formation in the coagulant bath during membrane production and hastening phase separation to form a more porous support with a minimal transition layer and relatively defect free skin in the membrane.

DETAILED DESCRIPTION

Figure 1:
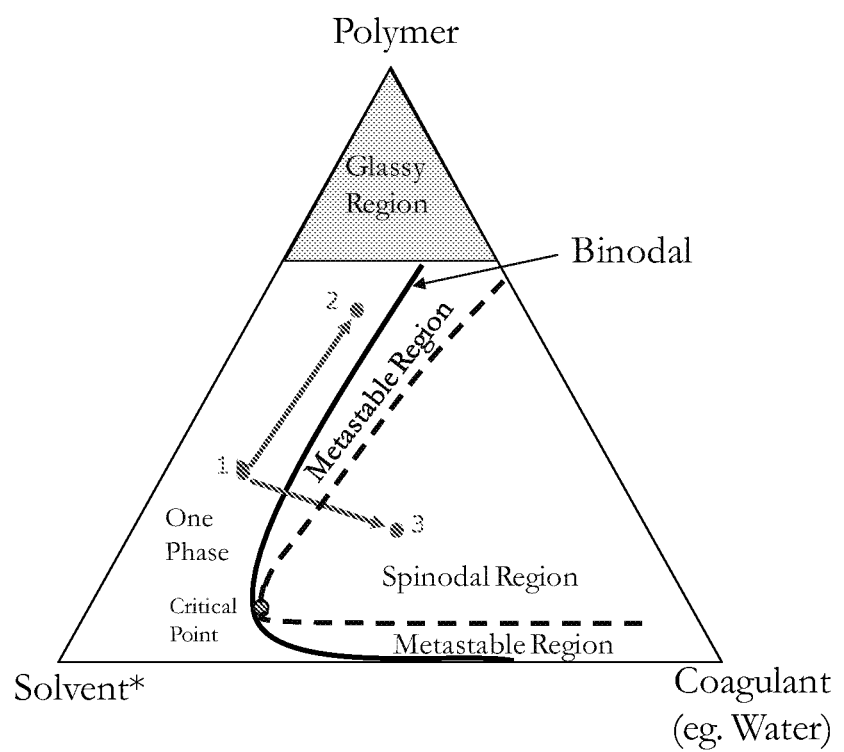
FIG. 1 shows the compositional change on a ternary phase diagram.

The present invention is directed to methods for preparing an integrally skinned, gas permeable asymmetric crosslinked hollow fiber. In general, the methods involve at least spinning a one phase solution comprising a monoesterified polyimide polymer, acetone as a volatile solvent, a spinning solvent, a spinning non-solvent, and optionally an organic or inorganic additive, wherein the volatile solvent is present in an amount of greater than 25 wt. % to about 50 wt. %, based on the total weight of the solution.

Definitions

The following terms are used throughout the specification and have the following meanings unless otherwise indicated.

As used herein, the term "carboxylic acid functional group" refers to a pendant group of —COOH—.

The term "diol" refers to a chemical compound containing two hydroxyl groups.

The term "carbodiimide" means a chemical compound containing the functional group N=C=N.

The term "dianhydride" refers to any compound that contains two anhydride

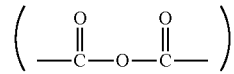

groups.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromoethyl, 2-chloro-pentyl, 6-iodo-hexyl, and the like).

The term "halo" or "halogenated" refers to a functional group including a halogen atom such as fluorine, chlorine, bromine, or iodine.

The term "phenyl" means an aromatic group of six carbon atoms having the formula —$C_6H_5$.

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "diamino cyclic compound" means a chemical compound having a ring structure of three to twelve carbon atoms where the ring structure is functionalized by two amino or substituted amino groups.

The term "amino" means a functional group having the formula —NR'R" where R' and R" are independently H, alkyl, cycloalkyl, and aryl.

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "aliphatic" refers to non-aromatic organic compounds, in which carbon atoms are joined together in straight or branched chains. Aliphatic includes paraffinic (e.g., alkyl), olefinic (e.g., alkenyl), and alkynyl compounds.

The term "antilyotropic salt" refers to a salt that interacts with solvent molecules rather than polymer molecules.

The term "amide" means a functional group having a carbonyl group (C=O) linked to a nitrogen atom or a compound that includes this functional group.

The term "ester" means a functional group having a carbonyl group (C=O) linked to an alkoxy group.

The term "alkoxy" refers to an alkyl group linked to an oxygen atom such as, for example, methoxy or ethoxy.

The term "aryl" refers to an unsaturated aromatic carbocyclic group of from 6 to 20 carbon atoms having a single ring (e.g., phenyl) or multiple condensed (fused) rings (e.g., naphthyl or anthryl). Exemplary aryls include phenyl, naphthyl and the like.

The term "alkenyl" refers to a linear or branched unsaturated monovalent hydrocarbon group having 2 to 12 carbon atoms and containing at least one, for example, from 1 to 3 double bond(s). This term is exemplified by groups such as ethenyl, 2-propenyl, and the like.

The term "alkynyl" refers to a linear or branched monovalent hydrocarbon group having 2 to 12 carbon atoms and containing at least one, for example, from 1 to 3 triple bond(s). This term is exemplified by groups such as ethynyl, 2-propynyl, n-butynyl and the like.

As used herein, the term "reduce" means to decrease or diminish.

Whenever used herein, the term "molecular weight" or "average molecular weight" means weight average molecular weight as measured by Gel Permeation Chromatography (GPC) using polystyrene as the standard. This method is described in ASTM D5296-05.

"Draw ratio" refers to the ratio of the take-up rate of an extruded fiber to the extrusion rate of the fiber.

I. Method of Making Monoesterified Polyimide Polymer

The monoesterified polyimide polymer can be obtained by (a) preparing a polyimide polymer comprising carboxylic acid functional groups from a reaction solution comprising monomers and at least one solvent; and (b) treating the polyimide polymer with a diol at esterification conditions in the presence of dehydrating conditions to form a monoesterified polyimide polymer, wherein the dehydrating conditions at least partially remove water produced during steps (a) and (b).

Step (a)-Polymerization Reaction and Imidization Reaction

In step (a), monomers are polymerized to form a polyamide polymer comprising amide bonds. Next, in step (a), an imidization reaction occurs wherein the amide bonds of the polyamide polymer form imide bonds transforming the polyamide polymer into a polyimide polymer and product water is removed. The resultant polyimide polymer includes carboxylic acid functional groups which are capable of crosslinking chains of the polyimide polymer.

Monomers

The monomers can comprise between about 15 and about 25 weight percent of the reaction solution.

At least some of the monomers include carboxylic acid functional groups such that the resultant polyimide polymer comprises carboxylic acid functional groups. The monomers can include dianhydrides, tetracarboxylic acids, and furandiones. The monomers can further include diamino compounds such as diamino cyclic compounds and diamino aromatics. The diamino aromatics can have more than one aromatic ring where the amino groups are on the same or different aromatic ring.

For example, the monomers can include monomers A, B, and C wherein A is a dianhydride of formula (I):

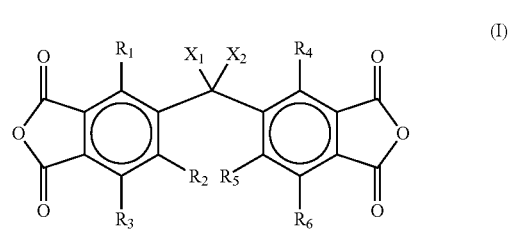

$X_1$ and $X_2$ are independently selected from halogenated alkyl, phenyl or halogen;

$R_1, R_2, R_3, R_4, R_5$, and $R_6$ are H, alkyl, or halogen;

B is a diamino cyclic compound without a carboxylic acid functionality; and

C is a diamino cyclic compound with a carboxylic acid functionality.

If the monomers are comprised of the monomers A, B, and C, the ratio of B to C can be between 1:4 and 8:1.

The monomer A can be 4,4'-(hexafluoroisopropylidene) diphthalic anhydride (6FDA), which is also known as (2,2-bis(3,4-dicarboxyphenyl) hexafluoropropane. 6FDA has the following formula:

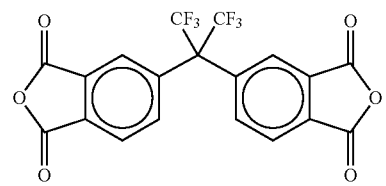

Including 6FDA in the monomers provides stability to the polyimide polymer because 6FDA has limited rotational ability.

Monomers with limited rotational ability, like 6FDA, are desirable because they increase the selectivity of the membrane made according to the methods disclosed herein. Monomers with bulky side groups, like $(CF_3)_2$ in 6FDA, also inhibit chain packing, which increases permeability of molecules through the membrane. Both selectivity and permeability are important for efficient and productive separations. Further reference to these structure property relationships can be found in Koros and Fleming, *Journal of Membrane Science*, 83, 1-80 (1993).

The monomer B, a diamino cyclic compound without a carboxylic acid functionality, can be a diamino aromatic compound with more than one aromatic ring where the amino groups are on the same or different aromatic rings. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenzene, or tetramethyldiaminobenzene. The monomer B can also be 2,4, 6-trimethyl-m-phenylenediamine (DAM), which is represented by the following formula:

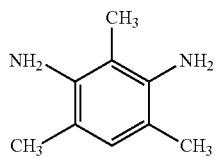

The monomer C, a diamino cyclic compound with a carboxylic acid functionality, can be diamino benzoic acid. It is represented by the following formula:

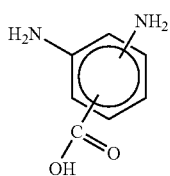

More specifically, the monomer C can be 3,5 diaminobenzoic acid (DABA).

In one embodiment of the methods as described herein, the monomers include A, B, and C where A is 6FDA, B is DAM, and C is DABA. In this embodiment, the 6FDA content of the monomer mixture is about 50 percent and the remaining about 50 percent of the monomer mixture is composed of DAM and DABA. The DABA content is between about 20 percent and about 100 percent of the remaining about 50 weight percent. For example, the 6FDA content of the monomer mixture can be about 50 percent and the remaining about 50 percent can be about 40 percent DABA and about 60 percent DAM. When 6FDA, DAM, and DABA are present in these stoichiometric concentrations, the polyimide polymer formed in step (a) is represented by the formula (II):

Solvents

The monomers are dissolved in at least one solvent to create a reaction solution and facilitate polymerization. The resulting polyamide polymer remains in the reaction solution for imidization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
| --- | --- |
| N-Methyl-2-pyrrolidone (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Dehydrating Conditions

If dehydrating conditions are utilized during step (a) to remove water, the concentration of water in the reaction solution can be maintained at between about 0 weight percent and about 0.26 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

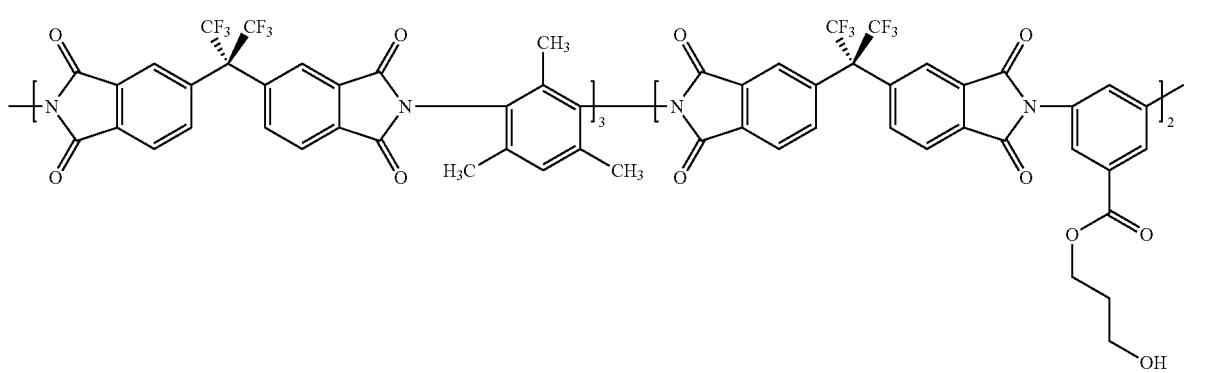

(II)

In another embodiment of the methods as described herein, the monomers include A, B, and C where A is 6FDA, B is DAM, and C is DABA as well as one or more additional dianhydrides.

Whichever monomers are used, according to some embodiments as described herein, they can be purified prior to step (a). The monomers can be purified by techniques known in the art, for example, sublimation or recrystallization.

If a chemical dehydrating agent is utilized, the chemical dehydrating agent does not impede the imidization reaction of step (a). For example, it does not decrease the imidization reaction rate or decrease the monoesterified, polyimide polymer yield. The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents include orthodichlorobenzene (ODCB), benzene, toluene, and mixtures thereof. Alternatively, the chemical dehydrating agent can be a carbodiimide.

If an azeotropic chemical dehydrating agent is used as the chemical dehydrating agent, it can be used in relatively large amounts, for example, between about 1 ml and about 4 ml per gram of the polyamide polymer. Such a large amount of azeotropic chemical dehydrating agent ensures that the water produced by the imidization reaction is removed from the reaction solution.

If a carbodiimide is used as the chemical dehydrating agent, it can be used in an amount between about 1 and about 4 times the stoichiometric amount based on moles of water removed.

The chemical dehydrating agent can also be periodically added to the reaction solution throughout step (a). For example, ODCB can be added periodically. According to one embodiment of the method as described herein, the chemical dehydrating agent is added to the reaction solution in three separate batches.

If a mechanical dehydrating agent is utilized, the mechanical dehydrating agent is a physical system designed to remove water. An exemplary mechanical dehydrating agent is a Dean-Stark trap.Ced-Stark traps are well known to those of ordinary skill in the art. Any mechanical system that prevents water distilled from the reaction solution from returning to the reaction solution can be suitable.

Polymerization Conditions

In the polymerization reaction of step (a), monomers are polymerized in the reaction solution to form a polyamide polymer. Polymerization can occur at room temperature while the reaction solution is stirred or otherwise agitated. Solvent concentration during polymerization is between about 75 and about 95 weight percent of the reaction solution.

Imidization Conditions

In the imidization reaction of step (a), the amide bonds of the polyamide polymer form imide rings to provide the polyimide polymer. The imidization reaction in step (a) occurs over an extended period of time, about 12 to about 36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization is between about 75 and about 95 weight percent of the reaction solution.

Step (b)—Monoesterification Reaction

Step (b) involves treating the polyimide polymer with a diol at esterification conditions in the presence of the dehydrating conditions to form a monoesterified polyimide polymer. Thus, during step (b), the polyimide polymer is subjected to monoesterification. After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot". Alternatively, the polyimide polymer can be isolated and then combined with the diol to form a monoesterification reaction solution such that the imidization reaction of step (a) and the monoesterification reaction of step (b) take place in separate reaction vessels.

Figure 2:
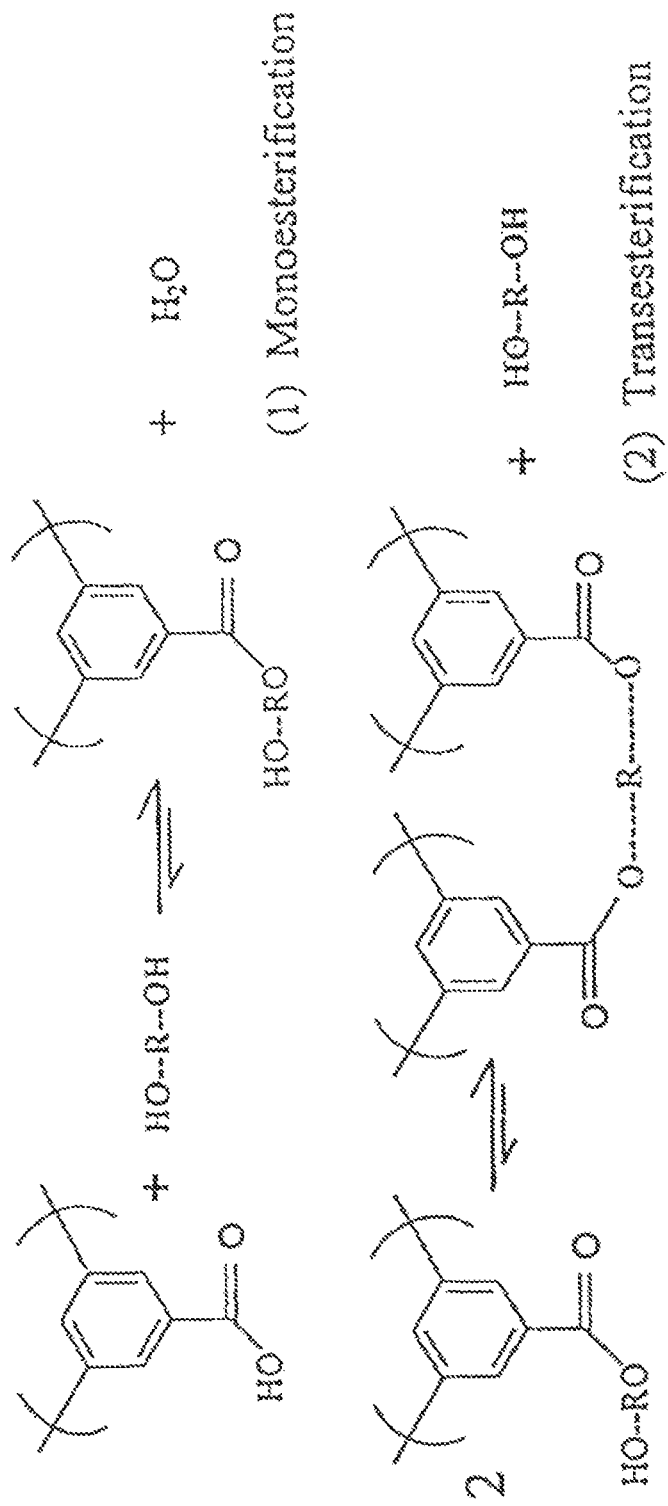
FIG. 2 shows both a monesterification reaction and a transesterification reaction.

FIG. 2 schematically illustrates the monoesterification reaction. As explained above, the monoesterification reaction involves one of the —OH groups in the diol molecules reacting with the —COOH groups of the polyimide polymer to convert the —COOH groups to esters and provide the monoesterified polyimide polymer. Water is also produced as a by-product during monoesterification. Importantly, in the method as described herein, at least a portion of the water is removed from the monoesterification reaction solution by the dehydrating conditions.

Along with the diol, an acid catalyst can also be added to the reaction solution to facilitate the monoesterification reaction.

The monoesterified polyimide polymer produced by step (b) can have an average molecular weight between about 50,000 and 300,000. In one embodiment, the monoesterified polyimide polymer has an average molecular weight between about 100,000 and about 200,000. In another embodiment, the monoesterified polyimide polymer has an average molecular weight between about 125,000 and about 200,000. The monoesterified polyimide polymer can also have a polydispersity index between about 2 and about 5.

In step (b), a monoesterification reaction takes place. More specifically, the carboxylic acid functional groups (—COOH) of the polyimide polymer react with the hydroxyl functional groups (—OH) of the diol to convert the —COOH groups to esters. This provides a monoesterified polyimide polymer and water as a by-product. Each diol molecule contains two —OH groups. During monoesterification, only one of the —OH groups of each diol molecule reacts with a —COOH group. Ideally, the conversion of —COOH groups to esters (i.e., the ester yield) is almost 100%. However, in some cases, the ester yield can be less than 100%. Any unconverted —COOH groups can act as crosslinkable sites in a later transesterification reaction whereby monoesterified polyimide polymer chains are crosslinked.

Moreover, in step (b), dehydrating conditions at least partially remove the water by-product such that the average molecular weight of the monoesterified polyimide polymer is partially maintained, fully maintained, or even increased. By at least partially removing the water-byproduct, which is only present in very small amounts, molecular weight retention during the monoesterification reaction to a significant degree is affected. While not wishing to be bound by any particular theory, it is believed that water can attack the imide rings of the polyimide polymer, which can cause chain scissioning and consequently reduce the average molecular weight of the polyimide polymer. These lower molecular weight polyimide polymer chains are then monoesterified resulting in a monoesterified, polyimide polymer lower in molecular weight than the original polyimide polymer. Up to about a 70% loss in molecular weight has been observed during monoesterification absent water removal. However, when dehydrating conditions are utilized, as described herein to eliminate at least some of the minimal amount of water present, a large molecular weight loss is not observed and a molecular weight gain has been obtained in certain instances.

While removal of the minimal amount of water produced during monoesterification may to some degree drive the monoesterification reaction forward, the removal of water is associated with smaller molecular weight loss, maintenance of molecular weight or even molecular weight gain.

Diol

The length of the diol plays a role in forming the monoesterified polyimide polymer of step (b). If the diol is too long or too short, it can decrease the permeability and/or selectivity of a membrane formed from the monoesterified, polyimide polymer. Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Dehydrating Conditions

As with the optional dehydrating conditions of step (a), the dehydrating conditions of step (b) can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during step (b) from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction of step (b). For example, it does not decrease the monoesterification reaction rate or decrease the monoesterified, polyimide polymer yield. The chemical dehydrating agent can be an azeotropic chemical dehydrating agent or can be a carbodiimide. An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof.

A carbodiimide functions as a chemical dehydrating agent by participating in the monoesterification reaction by activating the carboxylic acid functionality of the polyimide polymer toward ester formation and thereby eliminating the water by-product at the same time. This carbodiimide dehydration reaction mechanism is depicted below:

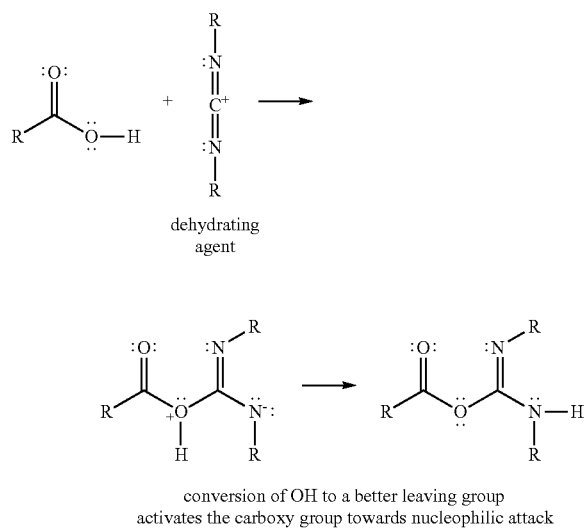

conversion of OH to a better leaving group
activates the carboxy group towards nucleophilic attack

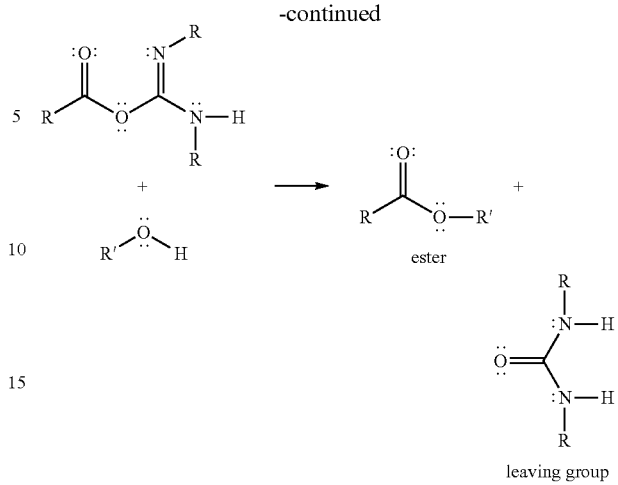

leaving group

If an azeotropic chemical dehydrating agent is used as the chemical dehydrating agent, it can be used in relatively large amounts, for example, between about 1 ml to about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount between about 1 and about 4 times the stoichiometric amount based on the moles of water removed.

The chemical dehydrating agent can also be periodically added to the monoesterification reaction solution throughout step (b). For example, ODCB can be added periodically. According to one embodiment of the method as described herein, the chemical dehydrating agent is added to the monoesterification reaction solution in three separate batches.

As in step (a), the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized in step (a), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Acid Catalyst

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

The amount of acid catalyst present during the monoesterification reaction, under dehydrating conditions, also effects the average molecular weight of the monoesterified, polyimide polymer. More particularly, it has been discovered that when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used in the method as described herein, the amount of acid catalyst can be further reduced from the conventional amount. This is due to the fact that DABA monomers are intrinsically acidic.

The acid catalyst can be added in amount ranging from about 0 milligrams to about 0.25 milligrams to the monoesterification reaction solution per gram of the polyimide polymer without experiencing undesirable molecular weight loss.

Monoesterification Conditions

The monoesterification reaction solution, with or without catalyst, is heated to a relatively high temperature over an extended period of time. Generally, the monoesterification reaction solution is heated for approximately 12 to 30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

In large (volume) scale reactions, it is advantageous for both the imidization reaction of step (a) and the monoesterification reaction of step (b) to occur in the same reaction vessel. Then any dehydrating conditions remaining from the imidization reaction can be easily utilized during the monoesterification reaction.

II. Crosslinked Hollow Fiber Membranes: Formation of Monoesterified Fiber

The method for forming crosslinked hollow fiber membranes involves forming monoesterified hollow fiber from the monoesterified polyimide polymer. Because the monoesterified polyimide polymer has a high average molecular weight, the monoesterified hollow fiber formed from such polymer exhibits increased strength and flexibility. If the monoesterified polyimide polymer is spun into monoesterified hollow fibers, such increased strength and flexibility allow the polymer fibers to be spun at higher take-up rates.

To make such monoesterified hollow fibers, the monoesterified polyimide polymer can be incorporated into a spinning dope, which is spun into monoesterified hollow fibers by means of a spinning process such as a wet-quench/dry-jet spinning process. While a wet-quench/dry-jet spinning process is discussed in detail below, it should be understood that other types of spinning methods such as, for example, wet spinning, can be used to form the monoesterified hollow fibers.

Spinning Dope to Form Monoesterified Hollow Fibers

The spinning dope is a homogeneous one phase solution and includes at least the monoesterified polyimide polymer, a volatile solvent, a spinning solvent, a spinning non-solvent, and optional inorganic additives.

Sufficient polymer must be present in order to form strong fibers and membranes capable of withstanding high pressures. However, too much polymer increases resistance in the membrane substructure and adversely affects membrane performance. In one embodiment of the methods as described herein, the monoesterified polyimide polymer is present in the spinning dope in an amount between about 20 and about 50 weight percent. In another embodiment, the monoesterified polyimide polymer is present in the spinning dope in an amount between about 25 and about 45 weight percent. In yet another embodiment, the monoesterified polyimide polymer is present in the spinning dope in an amount between about 30 and about 40 weight percent.

In one embodiment, the volatile solvent is acetone. In another embodiment, the volatile solvent for use herein should be of a sufficiently low toxicity, reported as Threshold Limit Value-Time Weighted Average toxicity, (TLV-TWA toxicity). This is sometimes variously referred to only as "TLV" or "TWA" (toxicity). The volatile solvent for use herein should have a toxicity that is low enough to allow eight hours continuous human exposure and a TWA short-term exposure limit (STEL) over a 15-minute period without adverse effects. The exposure limit, or toxicity, of the volatile solvent is of importance to protect the health and well-being of personnel using the material. Various government and industrial organizations express toxicity in different ways. The Occupational Safety and Health Administration (OSHA) expresses toxicity in terms of TLV-TWA which is the concentration of vapor in parts per million parts of air to which person can be exposed for eight hours per day or a 40 hour work week without adverse effects. OSHA also expresses toxicity in terms of TWA-STEL which is the maximum 15-minute concentration of vapor in parts per million parts of air to which workers may be exposed during any 15-minute period of the working day without adverse effects.

Accordingly, in one embodiment, the volatile solvent can be any organic solvent having a TLV-TWA toxicity of greater than 200 ppm exposure limit. In another embodiment, the volatile solvent for use herein can be any organic solvent having an OSHA personnel exposure limit greater than 200 ppm as an 8-hour TWA concentration and a TWA STEL greater than 250 ppm over a 15-minute period. Exemplary volatile solvents of this embodiment include acetone and the like.

In one embodiment, the volatile solvent is present in the spinning dope in an amount greater than 25 to about 50 weight percent, based on the total weight of the spinning dope. In another embodiment, the volatile solvent is present in the spinning dope in an amount greater than 25 and about 35 weight percent. In yet another embodiment, the volatile solvent is present in the spinning dope in an amount between about 35 and about 50 weight percent.

Figure 3:
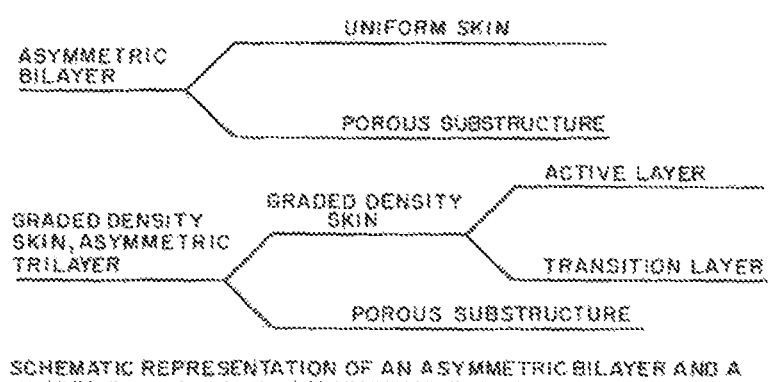
FIG. 3 is a schematic representation of an asymmetric bilayer and a graded density skin asymmetric trilayer.

The use of such an organic solvent in relatively high concentrations is believed to aid in the formation of the relatively defect free dense skin layer of the hollow fiber through evaporation in the air gap. The term "relatively defect free skin" as used herein shall be understood to mean a skinned membrane having 90% and above permselectivity of its dense film permselectivity. Moreover, by using relatively high concentrations of the volatile solvent, a relatively thin transition layer between the porous substructure and relatively defect free dense skin of uniform density is believed to be formed (See FIG. 3). This is in contrast to a bilayer. This analogy is illustrated in FIG. 3 which presents a schematic representation of bilayer asymmetric and trilayer asymmetric graded density skin membranes.

Essentially, the transition layer is the layer between the dense skin and the porous support that has gas flow resistance. A transition layer can be determined by a decrease in the He/$N_2$ permselectivity (i.e., ideal selectivity; ratio of the two permeabilities or permeances) versus ideal $O_2$/$N_2$ permselectivity for a hollow fiber when comparing against intrinsic dense film permselectivities. A hollow fiber membrane having a transition layer with gas resistance will show substantially the same $O_2$/$N_2$ permselectivity for both the fiber and dense film, but a lower He/$N_2$ permselectivity for the fiber. This is due to helium being a "fast" gas which is more affected by the resistance to the transition layer than oxygen. The presence of a thick transition layer can therefore be determined if the He/$N_2$ permselectivity is about 10% or more lower than the intrinsic permselectivity (i.e., the dense film value) with the $O_2$/$N_2$ permselectivity being essentially the same as the dense film value.

The volatile solvent and/or non-solvent may also effectively and efficiently evaporate during the dry jet step of the dry-jet/wet-quench spinning process and evaporation on the outside of the nascent membrane fiber is believed to help keep the polymer chains more entangled and at a higher concentration, which promotes vitrification and formation of the dense skin. The specified room temperature vapor pressure of the organic solvent can be greater than about 0.05 bar (5 kPa). Alternatively, the specified room temperature vapor pressure can be greater than about 0.1 bar (10 kPa). As another alternative, the specified room temperature vapor pressure can be greater than about 0.2 bar (20 kPa). The specified boiling point of the organic solvent can be between about 30° C. and about 100° C. Alternatively, the specified boiling point can be between about 40° C. and about 90° C. As another alternative, the specified boiling point can be between about 50° C. and about 70° C.

The optional organic or inorganic additive can enhance phase separation, increase substructure porosity, and increase viscosity of the spinning dope. Since the monoesterified, polyimide polymer has a large quantity of carboxyl functional groups, it is more hydrophilic than most traditional polymers used in spinning processes. Therefore, it takes a longer time for the monoesterified polyimide polymer to separate during the wet-quench step. The optional inorganic additive reduces the time necessary for phase separation of the monoesterified polyimide polymer.

The optional inorganic additive can be an antilyotropic salt. The term "antilyotropic salt" as used herein refers to a salt that interacts with solvent molecules rather than polymer molecules. See Ekiner O. M. et al., *Journal of Membrane Science* 53 (1990) 259-273. Exemplary antilyotropic salts include $LiNO_3$, $LiClO_4$, $MgCl_2$, $ZnCl_2$, and NaI.

While the inorganic additive can reduce the time required for phase separation, it is believed that excess inorganic additive (e.g. $LiNO_3$) can cause defect formation if the porosity extends into the non-vitrified skin layer of the hollow fiber. In one embodiment, the concentration of antilyotropic salt in the spinning dope is between about 0 and about 10 weight percent. In another embodiment, the concentration of the antilyotropic salt in the spinning dope is between about 2 and about 8 weight percent. In yet another embodiment, the concentration of the antilyotropic salt in the spinning dope is between about 4 and about 7 weight percent.

The spinning solvent can be a high boiling organic solvent. Exemplary high boiling organic solvents are listed in Table 1 above, along with their normal boiling points. A high boiling organic solvent that has a high affinity for water can enhance phase separation of the hollow fiber in the wet-quench step of the spinning process. N-Methyl-2-pyrrolidone (NMP) is a particularly desirable spinning solvent because it dissolves many polymers used in spinning, is relatively benign compared to other spinning solvents, and has a high affinity for water. The concentration of the spinning solvent can be dependent upon many factors, including the molecular weight of the monoesterified polyimide polymer, the polydispersity index of the monoesterified polyimide polymer, and the other components of the spinning dope, and can be determined by the precipitation method discussed below.

The spinning non-solvent can be a $C_2$ to $C_{10}$ alcohol, such as an aliphatic alcohol, or water. In one embodiment of the methods as described herein, the spinning non-solvent is a lower boiling $C_2$ aliphatic alcohol, for example, ethanol. The normal boiling point of ethanol is 78.4° C. Some spinning non-solvents (e.g., ethanol) can also serve as an additional volatile component. The concentration of the spinning non-solvent is directly dependent upon the spinning solvent concentration and can also be determined by the precipitation method discussed below.

The concentrations of spinning solvent and spinning non-solvent can be determined by an iterative precipitation method wherein the concentrations of the spinning solvent and the spinning non-solvent are dependent upon the respective concentrations of the monoesterified polyimide polymer, the volatile component, and the optional inorganic additive. Such precipitation method ensures that the spinning dope is a homogeneous one-phase solution, but is still close to the point of precipitation in order to reduce the phase separation time during the wet-quench step.

According to the precipitation method, the concentrations of the monoesterified polyimide polymer, the volatile component, and the optional inorganic additive are set. Initial concentrations of the spinning solvent and the spinning non-solvent are then chosen. The components, in these concentrations, are combined in a small sample vial. First, the volatile component, the spinning solvent, and the spinning non-solvent are mixed to form a solution. Next, the optional inorganic additive is added to the solution. After the optional inorganic additive dissolves in the solution, the monoesterified polyimide polymer is added to the solution to provide a spinning dope sample. The polymer can be added in batches to facilitate dispersion of the polymer throughout the solution. If the polymer precipitates out, the spinning solvent concentration is increased anywhere between about 0 weight percent and about 5 weight percent to arrive at the final spinning solvent concentration. The spinning non-solvent concentration is similarly decreased to arrive at the final spinning non-solvent concentration. If the polymer does not precipitate out, the concentration of the spinning solvent and/or the spinning non-solvent is altered and the precipitation test is repeated. Iterations occur until final concentrations are obtained that provide a homogeneous one-phase spinning dope close to the point of precipitation.

A larger amount of spinning dope can be prepared according to these final concentrations. It is advantageous to carry out the precipitation method with small sample amounts of spinning dope before spinning any batch of the spinning dope because the point of precipitation can vary as the structure and/or average molecular weight of the polymer varies.

Dry-Jet/Wet-Quench Spinning Process to Form Monoesterified Hollow Fibers

If a dry-jet/wet-quench spinning process is used to spin the high molecular weight, monoesterified polyimide polymer into hollow fibers, the skin and porous support layer can be formed in a single process.

Dry-jet/wet-quench spinning processes are well known in the art. Generally, in a dry-jet/wet-quench spinning process, spinning dope comprising a polymer is extruded into fibers or filaments through orifices of a spinneret, which is separated from a coagulating bath by a gaseous layer or non-coagulating liquid. The filaments are passed through the gaseous layer, such as air, or non-coagulating liquid, such as toluene or heptane, and then conducted into a coagulating bath. Conveyance of the filaments through the gaseous layer is commonly referred to as the dry jet step. The coagulating bath can be an either an aqueous system, such as pure water, or a non-aqueous system, such as methanol. Conveyance of the filaments through the coagulating bath is commonly referred to as the wet-quench step. After the filaments leave the coagulating bath, they can be washed. Washing is especially important if the coagulating bath contains any acid and can be accomplished with water alone or combinations of alkaline solutions and water. The filaments are dried and wound on a rotating drum. They can be air dried on the drum or the drum can be heated to facilitate drying.

According to an embodiment of the method of making the crosslinked hollow fiber membrane as described herein, a monoesterified polyimide polymer is extruded through orifices of a spinneret to provide hollow fibers. These hollow fibers are conveyed through a gaseous layer of air and through a coagulating bath of de-ionized water. The fibers exit the de-ionized water bath and are wound around a take-up drum.

The take-up drum can be partially contained in a vessel of room temperature de-ionized water in order to keep the fibers wet. The fibers can be left on the take-up drum for between about 10 minutes and about 20 minutes and then cut into strands and left in another de-ionized water bath for between about 2 days and about 3 days. The de-ionized water baths help remove solvent from the fibers. Water from the fibers can then be removed by fluid exchange with non-solvents of decreasing surface tension, for example, ethanol followed by removal of ethanol by hexane. Ultimately, the fibers can be air-dried and/or oven-dried.

According to the method as described herein, the spinneret orifices can have smaller dimensions than those used in conventional spinning processes. Smaller spinneret dimensions permit spinning of hollow fibers under normal conditions into fibers useful for making membranes that can be used under high pressure conditions, i.e., fibers with a diameter of less than 300 microns. The smaller spinneret dimensions also improve mixing in the spinneret and shearing during extrusion. Further, the smaller spinneret dimensions increase the extrusion velocity and consequently decrease the draw ratio, i.e., the take-up rate divided by the extrusion rate. Reduced draw ratios are desirable because excessively high draw ratios can induce high orientation/elongation stresses, which may be detrimental during further processing like crosslinking. For example, it was found that when hollow fibers were spun with a spinneret having larger dimensions, high draw ratios had to be applied to achieve fibers of reasonable dimensions (less than 300 microns) and these fibers became defective after crosslinking.

The annular diameter of the spinneret orifices can be approximately half the size of conventional spinneret orifices. For example, the annular diameter can be between about 600 microns and about 1300 microns and the bore needle outer diameter can be between about 300 microns and about 700 microns.

The draw ratio can be less than 150. Alternatively, the draw ratio can be less than 100. As another alternative, the draw ratio can be less than 50. As still another alternative, the draw ratio can be less than 10.

The distance between the point of extrusion out of the spinneret and the surface of the de-ionized water bath is referred to herein as the "air gap height." In one embodiment, the air gap height is greater than 0 cm. In one embodiment, the air gap height is greater than 0.1 cm. In one embodiment, the air gap height is greater than 1 cm. In one embodiment, the air gap height is greater than 5 cm. In one embodiment, the air gap height is greater than 10 cm. In one embodiment, the air gap height is greater than 20 cm. Larger air gap heights favor skin formation.

Similarly, relatively high spinning dope temperatures (i.e., the temperature of the spinning dope just before extrusion through the spinneret) favor skin formation. The spinning dope temperature can be greater than about 40° C. Alternatively, the spinning dope temperature can be greater than about 50° C. As yet another alternative, the spinning dope temperature can be greater than about 60° C.

As stated above, according to one embodiment, the coagulating bath contains de-ionized water. A sufficiently high coagulating bath temperature ensures adequate phase separation in the coagulating bath. If phase separation is inadequate, the fibers will be crushed in the first guide roll after extrusion. The coagulating bath temperature can be between about 10° C. and about 70° C. Alternatively, the coagulating bath temperature can be between about 25° C. and about 60° C. As another alternative, the coagulating bath temperature can be between about 40° C. and about 50° C.

The take-up rate, i.e., the speed at which the hollow fibers are wound around the take-up drum, can be much greater than take-up rates used when spinning low molecular weight polymers. This is due to the fact that the high molecular weight polymers as described herein can withstand the greater stresses associated with higher take-up rates. The take-up rate can be increased with a fixed extrusion rate if a smaller diameter fiber is required. Take-up rates between about 20 m/min and about 150 m/min are achievable according to the method as described herein.

The face velocity of air surrounding the spinneret can be greater than 50 ft/min (15 m/min). Alternatively, the face velocity of air surrounding the spinneret can be greater than 80 ft/min (24 m/min). As another alternative, the face velocity of air surrounding the spinneret can be greater than 100 ft/min (30 m/min).

Transesterification Reaction

The transesterification reaction involves subjecting the monoesterified polyimide polymer to transesterification conditions to form a crosslinked membrane. FIG. 2 schematically illustrates the transesterification reaction. In the transesterification reaction, the OH groups in esters in one monoesterified polyimide polymer chain react with esters in another monoesterified polyimide polymer chain to form a transester or crosslink. Any unconverted —COOH groups in one monoesterified polyimide polymer chain can also react with —OH groups in esters in another monoesterified polyimide polymer chain to form a crosslink. In this manner, the transesterification reaction crosslinks the monoesterified polyimide polymer chains.

The crosslinked hollow fiber membrane module is comprised of individual fibers of crosslinked polyimide polymer chains. For example, the crosslinked hollow fiber membrane can comprise an array of such fibers.

The crosslinked membrane is suitable for separating fluid mixtures, including both gaseous mixtures and liquid mixtures. The crosslinked hollow fiber membrane exhibits better permeability and selectivity than crosslinked hollow fiber membranes made from low molecular weight, monoesterified polyimide polymers.

Transesterification Conditions

Typical transesterification conditions are known in the art. Generally, transesterification can be accomplished by heating the monoesterified polyimide polymer. Heating initiates the transesterification reaction and, additionally, removes residual solvent.

The monoesterified, polyimide polymer can be heated to crosslink at a temperature of about 150° C. or higher under vacuum. In one embodiment, the monoesterified, polyimide polymer is heated to crosslink at a temperature of about 180° C. or higher under vacuum. In another embodiment, the monoesterified, polyimide polymer is heated to crosslink at a temperature of about 200° C. or higher under vacuum. For example, the monoesterified hollow fibers can be heated under vacuum at 200° C. for approximately 2 hours and cooled under vacuum for approximately 6 hours. Higher temperatures result in a greater degree of crosslinking. However, temperatures of about 300° C. or higher may damage the skin layer of a crosslinked hollow fiber membrane made according to the methods as described herein.

Transesterification can also be accomplished by UV or microwave treatment. Furthermore, transesterification reactions can be catalyzed. Transesterification catalysts can be the same acid catalysts used during monoesterification, which include para-toluene sulfonic acid, sulfuric acid, methanesulfonic acid, triflic acid, and mixtures thereof.

Separation Systems Including the Membranes

Membranes as disclosed herein can be used in separation systems like those discussed in U.S. Pat. Nos. 6,932,859 and 7,247,191, which are incorporated herein by reference in their entirety.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes.

Hollow fibers as described herein can be employed in bundled arrays embedded in a sealant (potted) at either end to form tube sheets and fitted into a pressure vessel thereby isolating the insides of the tubes from the outsides of the tubes. The fibers are held together by any conventional means. Typically one end of the fiber bundle extends to one end of the pressure shell and the opposite end of the fiber bundle extends to the opposite end of the pressure shell. The fiber bundle is fixably or removably affixed to the pressure shell by any conventional method to form a pressure tight seal. Devices of this type are known in the art. In separation systems of this type, the direction of flow in a hollow fiber element can be counter-current rather than co-current or even transverse.

Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby gas entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels the gas re-emerges from the hollow fiber bundle through the holes at the opposite end of the spiral wrap and is directed out of the module.

Industrial hollow fiber membrane modules typically contain hundreds of thousands of individual hollow fibers. The number of fibers bundled together will depend on fiber diameters, lengths, and porosities and on desired throughput, equipment costs, and other engineering considerations understood by those in the chemical engineering arts.

Specifically, to maximize productivity, the hollow fibers typically include a "skin" layer on a porous support. Generally, the thickness of the skin layer can range from about 0.025 microns to about 1 micron. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are incorporated by reference herein in their entirety.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are herein incorporated by reference in their entirety.

The membranes can be included in a separation system that includes an outer perforated shell surrounding one or more inner tubes that contain membranes. The shell and the inner tubes can be surrounded with packing to isolate a contaminant zone.

In one mode of operation, a gaseous mixture enters the separation system via a contaminant collection zone through the perforations in the outer perforated shell. The gaseous mixture passes upward through the inner tubes.

As the gaseous mixture passes through the inner tubes, one or more components of the mixture permeate out of the inner tubes through the selective membrane and enter the contaminant collection zone.

The membranes can be included in a cartridge and used for permeating contaminants from a gaseous mixture. The contaminants can permeate out through the membrane, while the desired components continue out the top of the membrane. The membranes can be stacked within a perforated tube to form the inner tubes or can be interconnected to form a self-supporting tube.

Each one of the stacked membrane elements can be designed to permeate one or more components of the gaseous mixture. For example, one membrane can be designed for removing carbon dioxide, a second for removing hydrogen sulfide, and a third for removing nitrogen. The membranes can be stacked in different arrangements to remove various components from the gaseous mixture in different orders.

Different components can be removed into a single contaminant collection zone and disposed of together, or they can be removed into different zones. The membranes can be arranged in series or parallel configurations or in combinations thereof depending on the particular application.

The membranes can be removable and replaceable by conventional retrieval technology such as wire line, coil tubing, or pumping. In addition to replacement, the membrane elements can be cleaned in place by pumping gas, liquid detergent, or other material past the membrane to remove materials accumulated on the membrane surface.

A gas separation system including the membranes described herein can be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture can be caused to rotate or swirl within an outer tube. This rotation can be achieved in any known manner, for example, using one or more spiral deflectors. A vent can also be provided for removing and/or sampling components removed from the gaseous mixture.

Ideally, the membranes are durable, resistant to high temperatures, and resistant to exposure to liquids. The materials can be coated, ideally with a polymer, to help prevent fouling and improve durability. Examples of suitable polymers include those described in U.S. Pat. Nos. 5,288,304 and 4,728,345, the contents of which are incorporated by reference herein in their entirety. Barrier materials can also be used as a pre-filter for removing particulates and other contaminants which can damage the membranes.

It will be understood that various modifications can be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for preparing a crosslinked hollow fiber membrane, the method comprising spinning into a monoesterifed fiber a one phase solution comprising a monoesterified polyimide polymer, acetone as a volatile solvent, a spinning solvent, and a spinning non-solvent, wherein the volatile solvent is present in an amount of greater than 25 wt. % to about 50 wt. %, based on the total weight of the solution; and
subjecting the monoesterified fiber to transesterification conditions to prepare a crosslinked hollow fiber membrane.

2. The method of claim 1, wherein the monoesterified polyimide polymer is present in the spinning solution in an amount between about 20 and about 50 weight percent.

3. The method of claim 1, wherein the monoesterified, polyimide polymer has an average molecular weight between about 50,000 and about 300,000.

4. The method of claim 1, wherein the monoesterified, polyimide polymer has a polydispersity index between about 2 and about 5.

5. The method of claim 1, wherein the volatile solvent is present in an amount of greater than 25 wt. % to about 35 wt. %, based on the total weight of the solution.

6. The method of claim 1, wherein the volatile solvent is present in an amount of about 35 wt. % to about 50 wt. %, based on the total weight of the solution.

7. The method of claim 1, wherein the spinning solvent is an organic solvent selected from the group consisting of N-methyl-2-pyrrolidone (NMP), dimethyl sulfoxide (DMSO), dimethylformamide (DMF), dimethylacetamide (DMAc), and diglyme.

8. The method of claim 1, wherein the one phase solution further comprises one or more inorganic additives.

9. The method of claim 8, wherein the inorganic additive is an antilyotropic salt.

10. The method of claim 1, wherein the spinning non-solvent is selected from the group consisting of a $C_2$ to $C_{10}$ aliphatic alcohol, water, and mixtures thereof.

11. The method of claim 1, wherein the spinning non-solvent is ethanol.

12. The method of claim 1, wherein the monoesterified hollow fiber is spun from the spinning dope by a dry-jet/wet-quench spinning process comprising:
(a) extruding the monoesterified polyimide polymer through orifices of a spinneret to provide a monoesterified hollow fiber;
(b) conveying the monoesterified hollow fiber through an air gap and through a coagulating bath of de-ionized water; and
(c) winding the monoesterified hollow fiber around a take-up drum at a take-up rate between about 10 m/min and about 150 m/min, wherein the dry-jet/wet-quench spinning process has a draw ratio of less than 150.

13. The method of claim 12, wherein the temperature of the spinning solution is greater than about 40° C.

14. The method of claim 12, wherein the temperature of the coagulating bath is between about 10° C. and about 70° C.

15. The method of claim 12, wherein the dry-jet/wet-quench spinning process has an air gap height that is greater than 0.1 centimeter.

16. The method of claim 12, wherein the dry-jet/wet-quench spinning process has a face velocity of air surrounding the spinneret that is greater than 15 m per minute.

17. The method of claim 1, wherein the resulting crosslinked membrane comprises a porous substructure and a relatively defect free dense skin of uniform density.

18. A method of using a hollow fibers membrane made according to the method of claim 1, comprising:
(a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas,
the feed stream including a gaseous component selected from the group consisting of nitrogen, oxygen, hydrogen, hydrogen sulfide and carbon dioxide;
(b) maintaining a pressure differential between an upstream side of the membrane and a downstream side of the membrane;
(c) contacting the upstream side of the membrane with the feed stream at a pressure between about 20 psia and about 4000 psia;
(d) isolating a permeate stream on the downstream side of the membrane having a larger mole fraction of the faster permeating component of the feed stream; and
(e) isolating a retentate stream having a smaller mole fraction of the faster permeating component of the feed stream.

19. A method for preparing a crosslinked hollow fiber membrane, the method comprising spinning a one phase solution comprising a monoesterified polyimide polymer, a volatile solvent having a threshold limit value time-weighted average (TLV-TWA) toxicity of greater than 200 parts per million (ppm) exposure limit, a spinning solvent, and a spinning non-solvent, wherein the volatile solvent is present in an amount of greater than 25 wt. % to about 50 wt. %, based on the total weight of the solution.

* * * * *